No. 798,102. PATENTED AUG. 29, 1905.
C. T. HONNEUS.
LEAPING THE LETTER S.
APPLICATION FILED FEB. 7, 1905.
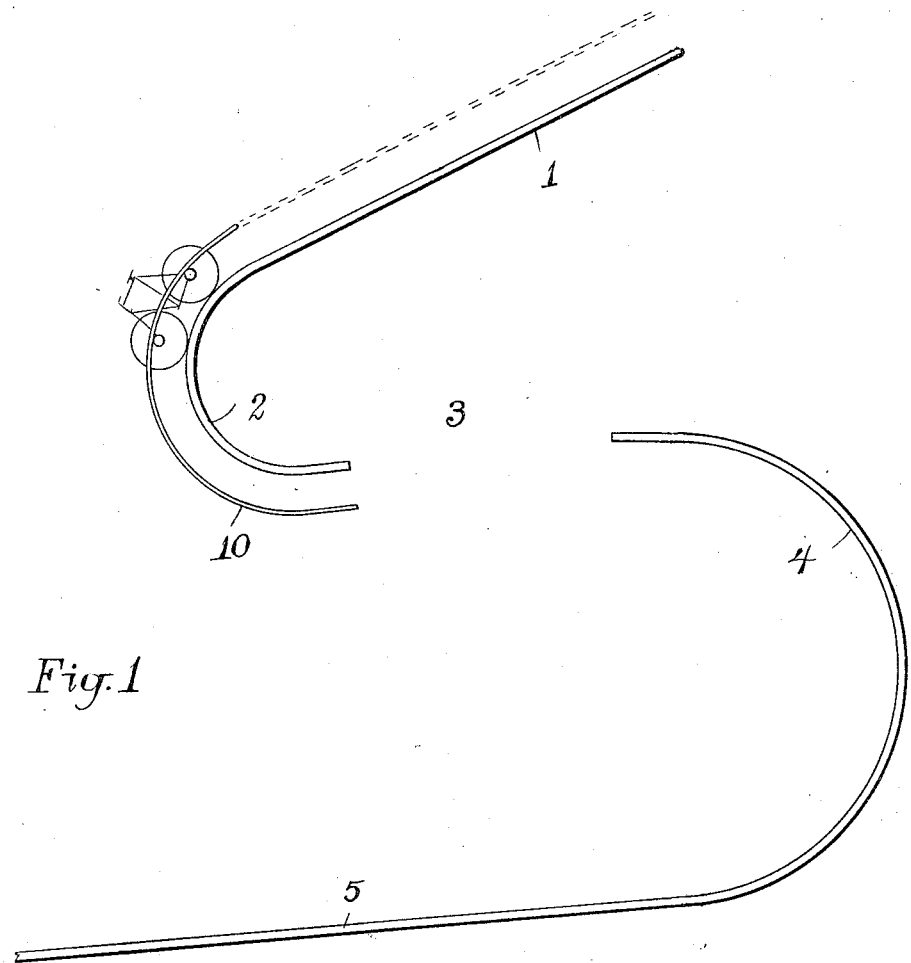
Fig. 1
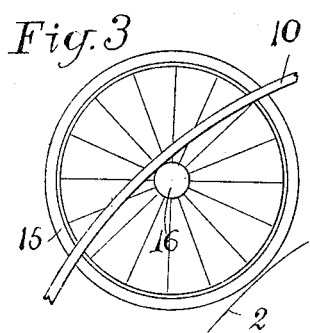
Fig. 3
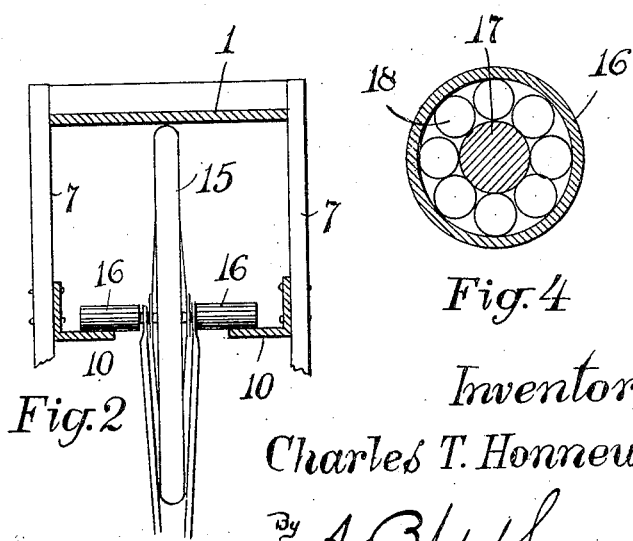
Fig. 2
Fig. 4
Attest:
A. D. Elwell.
Inventor,
Charles T. Honneus;
By A. B. Upham,
His Attorney.

UNITED STATES PATENT OFFICE.

CHARLES THOMAS HONNEUS, OF NEPONSET, MASSACHUSETTS, ASSIGNOR TO BARNUM & BAILEY, LTD., OF NEW YORK, N. Y., A CORPORATION OF GREAT BRITAIN.

LEAPING THE LETTER S.

No. 798,102.      Specification of Letters Patent.      Patented Aug. 29, 1905.

Application filed February 7, 1905. Serial No. 244,597.

*To all whom it may concern:*

Be it known that I, CHARLES THOMAS HONNEUS, a citizen of the United States, and a resident of Neponset, Commonwealth of Massachusetts, have invented certain new and useful Improvements in Leaping the Letter S, of which the following is a full, clear, and exact description.

The object of this invention is the construction of an improved amusement device by means of which a bicycle, automobile, or other vehicle can be made to maintain itself in an abnormal and startling course, such course embracing certain new features hereinafter set forth.

Referring to the drawings forming part of this specification, Figure 1 is a side elevation of the amusement device embodying my improvements. Fig. 2 is a detail view showing the track and its rail in cross-section and a bicycle-wheel supported by said rail. Fig. 3 is a detail view illustrating a bicycle or other wheel just beginning its engagement with said rail; and Fig. 4 is a cross-section, full size, of one of the extended wheel-axles by which said rails are engaged.

The course along which I have arranged for a bicycle or other vehicle to pass consists of the momentum-acquiring length of track 1, the first curve 2, the jumping-space 3, second or receiving curve 4, and landing-board 5. It will be seen that said track conforms to what may be roughly conceived of as a letter S, but having a gap therein, whence the name is derived of "leaping the letter S."

Ordinarily, as in the so-called "looping the loop," the vehicle is maintained in its upside-down part of the track by centrifugal force; but it is evident that such force cannot be utilized in passing the bicycle about the curve 2, where both the vehicle's momentum and centrifugal force combine to drive it away from such curved path. To solve this problem a pair of rails 10 are secured in position by any suitable means, as the supporting-braces 7, (shown in Fig. 2,) concentric with the curve 2 and at a distance from its face slightly in excess of the radius of the vehicle's wheels 15, and the hubs or axles of said wheels are formed with antifriction extensions 16, projecting far enough laterally to come beneath said rails, as shown in Fig. 1. Said extensions I prefer to have simple shells or cylinders 16 of a limited diameter, usually scarcely over an inch, with ball-bearings 18 between them and the extended hubs or axles 17. As the bicycle, for which this invention is preferably intended, comes flying down the incline 1 and reaches the point thereof where it would otherwise be precipitated with its rider to the ground below said antifriction extended hubs 16 come into contact with the rails 10 and are forced by the latter to guide the bicycle to the very end of the curve 2. From this point the momentum of the wheel and rider causes them to jump the gap 3 and meet the curve 4, down which they speed in obedience to gravity and centrifugal force to the landing-board 5.

Although I have illustrated the rails 10 as embracing only the curved section 2, they may extend upward to the entire height of the incline 1 in order the better to insure the bicycle's position and safety during its rapid descent. I also prefer to form the rails 10 from angle-irons, as shown in Fig. 2, for the sake of strength.

What I claim as my invention, and for which I desire Letters Patent, is as follows, to wit:

1. The combination with a vertical curved track, of rails concentric therewith but exterior thereto, and a vehicle having its wheels arranged for travel along said track and provided with antifriction devices disposed to come into engagement with said rails and thereby retain said vehicle in position upon said track.

2. The combination with a track and rails located parallel therewith, of a wheeled vehicle having antifriction extensions of its axles disposed to come between said rails and said track.

3. The combination with a track and rails located parallel therewith, of a wheeled vehicle having the axles of each wheel laterally extended, a cylindrical shell about each extension, and ball-bearings between each said shell and extension.

4. An amusement device comprising a track in the form of a vertical letter S but having a gap or break therein, a pair of rails concentric with but exterior to the upper of the curves in said track, and a bicycle running on said track and provided with antifriction axle extensions for engaging said rails and keeping the bicycle upon the track when rounding said curve.

In testimony whereof I have affixed my signature in presence of two witnesses.

CHARLES THOMAS HONNEUS.

Witnesses:
 WILLIAM ED. HONNEUS,
 EUGENE L. MURPHY.